US011128392B2

(12) United States Patent
Wen et al.

(10) Patent No.: US 11,128,392 B2
(45) Date of Patent: Sep. 21, 2021

(54) TIMING METHOD FOR MOBILE NETWORK, DEVICE, AND READABLE STORAGE MEDIUM

(71) Applicant: BEIJING UNIVERSITY OF POSTS AND TELECOMMUNICATIONS, Beijing (CN)

(72) Inventors: Xiangming Wen, Beijing (CN); Chenyu Zhang, Beijing (CN); Wei Zheng, Beijing (CN); Zhaoming Lu, Beijing (CN); Luhan Wang, Beijing (CN); Zhengying Wang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 63 days.

(21) Appl. No.: 16/561,945

(22) Filed: Sep. 5, 2019

(65) Prior Publication Data

US 2020/0252151 A1 Aug. 6, 2020

(30) Foreign Application Priority Data

Feb. 2, 2019 (CN) ........................ 201910107985.0

(51) Int. Cl.
*H04J 3/06* (2006.01)

(52) U.S. Cl.
CPC ............ *H04J 3/0644* (2013.01); *H04J 3/065* (2013.01); *H04J 3/0667* (2013.01)

(58) Field of Classification Search
None
See application file for complete search history.

(56) References Cited

U.S. PATENT DOCUMENTS

| | | | | |
|---|---|---|---|---|
| 9,258,106 | B2 * | 2/2016 | Ogawa | H04B 7/18515 |
| 9,749,972 | B2 * | 8/2017 | Bin Sediq | H04W 56/001 |
| 10,484,163 | B2 * | 11/2019 | Tanwar | H04J 3/0667 |
| 10,855,388 | B2 * | 12/2020 | Joseph | H04J 3/0697 |
| 10,939,400 | B2 * | 3/2021 | Goel | H04L 27/2695 |
| 2017/0195110 | A1 * | 7/2017 | Ruffini | H04W 56/0015 |
| 2019/0059066 | A1 * | 2/2019 | Harmatos | H04J 3/0673 |
| 2019/0190635 | A1 * | 6/2019 | Goel | H04J 3/0644 |
| 2020/0228220 | A1 * | 7/2020 | Joseph | H04J 3/0644 |

FOREIGN PATENT DOCUMENTS

| | | |
|---|---|---|
| CN | 101729127 A | 6/2010 |
| CN | 102035589 A | 4/2011 |
| CN | 109257133 A | 1/2019 |

* cited by examiner

*Primary Examiner* — Tri H Phan
(74) *Attorney, Agent, or Firm* — Seed IP Law Group LLP

(57) ABSTRACT

Embodiments of the present disclosure disclose a timing method and a device for a mobile network. The mobile network comprises: a master clock, a first network, a first network device, and a second network device. The first network device acquires timing information from the master clock through the first network, calibrates a second network device clock of the second network device according to the timing information, and calibrates a terminal clock of a terminal device according to the calibrated second network device clock.

13 Claims, 11 Drawing Sheets

TIMING METHOD FOR MOBILE NETWORK, DEVICE, AND READABLE STORAGE MEDIUM

TECHNICAL FIELD

The present disclosure relates to the field of wireless communication technologies, and in particular, to a timing method for mobile network, a device, and readable storage medium.

BACKGROUND

Timing has a very important foundational role in communication networks. In a wired optical network, the high-precision timing protocol (PTP protocol) proposed according to the IEEE1588v2 standard can achieve timing accuracy of an order of 10 ns by using link symmetry. In a current mobile network, when a terminal device communicates with a base station device, the uplink synchronization and the downlink synchronization are relative time synchronization based on the alignment of the radio frame/subframe boundary, and the absolute timing cannot be performed. The direct application of the traditional network time protocol (NTP protocol) or PTP protocol in the mobile network is affected by factors such as the instability of the air interface link, resulting in a decrease in timing performance.

SUMMARY

An aspect of the present disclosure provides a timing method for a mobile network, the mobile network including a first clock, a first network, a first network device, and a second network device, the method including acquiring, by the first network device, timing information from the first clock through the first network; calibrating a second network device clock of the second network device according to the timing information; and calibrating a terminal clock of the terminal device according to the calibrated second network device clock.

Optionally, the first clock is a master clock, and/or the first network is a core network, and/or the first network device is a mobile edge computing platform, and/or the second network device is a base station.

Another aspect of the present disclosure provides a timing method for a first network device including receiving timing information from a first clock through the first network; and calibrating a second network device clock of a second network device according to the timing information.

Optionally, the receiving the timing information from the first clock through the first network includes receiving the timing information from the first clock via a first network timing service slice; and/or receiving the timing information from the first clock according to a high precision timing protocol; and/or receiving the timing information from the first clock through the first network at predetermined time intervals.

Optionally, the calibrating the second network device clock of the second network device according to the timing information includes calibrating a first network device clock of the first network device according to the timing information; and calibrating the second network device clock of the second network device according to the calibrated first network device clock; and/or calibrating the second network device clock of the second network device in response to a timing service request of the second network device.

Optionally, the timing method for the first network device further includes calculating a motion compensated timing advance value TA'.

Optionally, $$TA' = TA - \frac{1}{c}(\|\vec{d}_1\| - \|\vec{d}_0\|),$$

wherein TA is a timing advance value, d0 is a distance between the second network device and a terminal device at the time te1, d1 is a distance between the second network device and a terminal device when the second network device transmits the TA', and c is the speed of light.

Optionally, the first clock is a master clock, and/or the first network is a core network, and/or the first network device is a mobile edge computing platform, and/or the second network device is a base station.

Another aspect of the present disclosure provides a timing method for a second network device, including calibrating a second network device clock of the second network device according to a timing information received by a first network device from a first clock through a first network; and calibrating a terminal clock of a terminal device according to the calibrated second network device clock.

Optionally, the calibrating the second network device clock according to the timing information received by the first network device from the first clock through the first network includes calibrating the second network device clock of the second network device based on a calibrated first network device clock of the first network device, wherein the first network device clock is calibrated based on the timing information received from the first clock.

Optionally, the calibrating the terminal clock of the terminal device according to the calibrated second network device clock includes transmitting a first signal to the terminal device at time te1 of the calibrated second network device clock; and transmitting a first time information for determining the time te1 to the terminal device.

Optionally, the calibrating the terminal clock of the terminal device according to the calibrated second network device clock further includes receiving, at time te3 of the calibrated second network device clock, a second signal sent by the terminal at time tue3 of the terminal clock; transmitting a second time information for determining the time te3; and transmitting a timing advance value TA or a motion compensated timing advance value TA'.

Optionally, $$TA' = TA - \frac{1}{c}(\|\vec{d}_1\| - \|\vec{d}_0\|),$$

wherein TA is the timing advance value, d0 is a distance between the second network device and the terminal device at the time te1, d1 is a distance between the second network device and the terminal device when the second network device transmits TA', and c is the speed of light.

Optionally, the first clock is a master clock, and/or the first network is a core network, and/or the first network device is a mobile edge computing platform, and/or the second network device is a base station.

Another aspect of the present disclosure provides a timing method for a terminal device including receiving, at time tue1 of a terminal clock of the terminal device, a first signal sent by a second network device at time te1 of a second network device clock of the second network device; receiving a first time information for determining the time te1; and calibrating the terminal clock of the terminal device according to at least the time te1 and the time tuel, wherein, the second network device clock is calibrated according to a timing information received by a first network device from a first clock through a first network.

Optionally, the timing method for the terminal device, before calibrating the terminal clock of the terminal device according to at least the time te1 and the time tue1, further includes transmitting a second signal to the second network device at time tue3 of the terminal clock, the second signal being received by the second network device at time te3 of the second network device clock; receiving a second time information for determining the time te3; and receiving a timing advance value TA or a motion compensated timing advance value TA', wherein, the calibrating the terminal clock of the terminal device according to at least the time te1 and the time tue1 comprises calibrating the terminal clock according to TA or TA', te1, tue1, te3, and tue3.

Optional, $$TA' = TA - \frac{1}{c}(\|\vec{d}_1\| - \|\vec{d}_0\|),$$

wherein TA is the timing advance value, d0 is a distance between the second network device and the terminal device at the time te1, d1 is a distance between the second network device and the terminal device when the second network device transmits TA', and c is the speed of light.

Optionally, the first clock is a master clock, and/or the first network is a core network, and/or the first network device is a mobile edge computing platform, and/or the second network device is a base station.

Another aspect of the present disclosure provides a first network device including means for receiving timing information from a first clock through the first network; and means for calibrating a second network device clock of a second network device according to the timing information.

Optionally, the receiving the timing information from the first clock through the first network includes receiving the timing information from the first clock via a first network timing service slice; and/or receiving the timing information from the first clock according to a high precision timing protocol; and/or receiving the timing information from the first clock through the first network at predetermined time intervals.

Optionally, the calibrating the second network device clock of the second network device according to the timing information includes calibrating a first network device clock of the first network device according to the timing information, and calibrating the second network device clock of the second network device according to the calibrated first network device clock; and/or calibrating the second network device clock of the second network device in response to a timing service request of the second network device.

Optionally, the first network device further includes means for calculating a motion compensated timing advance value TA'.

Optionally, $$TA' = TA - \frac{1}{c}(\|\vec{d}_1\| - \|\vec{d}_0\|),$$

wherein TA is a timing advance value, d0 is a distance between the second network device and a terminal device at time te1, d1 is a distance between the second network device and a terminal device when the second network device transmits the TA', and c is the speed of light.

Optionally, the first clock is a master clock, and/or the first network is a core network, and/or the first network device is a mobile edge computing platform, and/or the second network device is a base station.

Another aspect of the present disclosure provides a second network device including means for calibrating a second network device clock of the second network device according to a timing information received by a first network device from a first clock through a first network; and means for calibrating a terminal clock of a terminal device according to the calibrated second network device clock.

Optionally, the calibrating the second network device clock according to the timing information received by the first network device from the first clock through the first network includes calibrating the second network device clock of the second network device based on a calibrated first network device clock of the first network device, wherein the first network device clock is calibrated based on the timing information received from the first clock.

Optionally, the calibrating the terminal clock of the terminal device according to the calibrated second network device clock includes transmitting a first signal to the terminal device at time te1 of the calibrated second network device clock; and transmitting a first time information for determining the time te1 to the terminal device.

Optionally, the calibrating the terminal clock of the terminal device according to the calibrated second network device clock further includes receiving, at time te3 of the calibrated second network device clock, a second signal sent by the terminal at time tue3 of the terminal clock; transmitting a second time information for determining the time te3; and transmitting a timing advance value TA or a motion compensated timing advance value TA'.

Optionally, $$TA' = TA - \frac{1}{c}(\|\vec{d}_1\| - \|\vec{d}_0\|),$$

wherein TA is the timing advance value, d0 is a distance between the second network device and the terminal device at the time te1, d1 is a distance between the second network device and the terminal device when the second network device transmits TA', and c is the speed of light.

Optionally, the first clock is a master clock, and/or the first network is a core network, and/or the first network device is a mobile edge computing platform, and/or the second network device is a base station.

Another aspect of the present disclosure provides a terminal device including means for receiving, at time tuel of a terminal clock of the terminal device, a first signal sent by a second network device at time te1 of a second network device clock of the second network device; means for receiving a first time information for determining the time te1; and means for calibrating the terminal clock of the terminal device according to at least the time te1 and the time tue1, wherein the second network device clock is calibrated according to a timing information received by a first network device from a first clock through a first network.

Optionally, the terminal device further including means for transmitting a second signal to the second network device at time tue3 of the terminal clock, the second signal being received by the second network device at time te3 of the second network device clock; means for receiving a second time information for determining the time te3; and means for receiving a timing advance value TA or a motion compensated timing advance value TA', wherein, the calibrating the terminal clock of the terminal device according to at least the time te1 and the time tue1 includes calibrating the terminal clock according to TA or TA', te1, tue1, te3, and tue3.

Optionally, $$TA' = TA - \frac{1}{c}(\|\vec{d_1}\| - \|\vec{d_0}\|),$$

wherein TA is the timing advance value, d0 is a distance between the second network device and the terminal device at the time te1, d1 is a distance between the second network device and the terminal device when the second network device transmits TA', and c is the speed of light.

Optionally, the first clock is a master clock, and/or the first network is a core network, and/or the first network device is a mobile edge computing platform, and/or the second network device is a base station.

Another aspect of the present disclosure provides the first network device including one or more processors; and one or more memories storing executable instructions, which, when being executed by the one or more processors, cause the one or more processors to be configured for implementing the timing method of the first network device.

Optionally, the first network device is a mobile edge computing platform.

Another aspect of the present disclosure provides a second network device including one or more processors; and one or more memories storing executable instructions, which, when being executed by the one or more processors, cause the one or more processors to be configured for implementing the timing method of the second network device.

Optionally, the second network device is a base station.

Another aspect of the present disclosure provides a terminal device including one or more processors; and one or more memories storing executable instructions, which, when being executed by the one or more processors, cause the one or more processors to be configured for implementing the timing method of the terminal device.

Another aspect of the present disclosure provides a computer readable storage medium storing executable instructions, which, when being executed by a processor, cause the processor to be configured for implementing the timing method of any one of the first network device, the second network device, and the terminal device.

BRIEF DESCRIPTION OF THE DRAWINGS

Other objects and advantages of the present disclosure will become more apparent from the detailed description of the unlimited embodiments. In the drawings.

DETAILED DESCRIPTION

Figure 1:
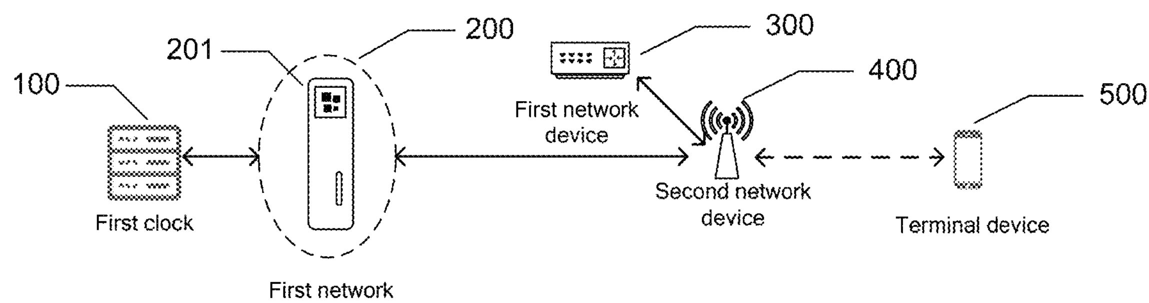
FIG. 1 shows a system architecture diagram of a mobile network to which a timing method may be applied according to an embodiment of the present disclosure.

Hereinafter, exemplary embodiments of the present disclosure will be described in details with reference to the accompanying drawings so that those of ordinary skilled in the art can easily implement these embodiments. Further, portions that are not related to the description of the exemplary embodiments are omitted in the drawings for the sake of clarity.

In the present disclosure, it is to be understood that the terms such as “including” or “having” are intended to indicate the presence of features, numbers, steps, acts, components, parts or combinations thereof. The possibility of the presence or addition of a plurality of other features, numbers, steps, acts, components, parts or combinations thereof is not excluded.

It should also be noted that the embodiments of the present disclosure and the features of the embodiments may be combined with each other without conflict. Next, the present disclosure will be described in details with reference to the drawings and embodiments.

FIG. 1 shows a system architecture diagram of a mobile network to which a timing method may be applied according to an embodiment of the present disclosure.

As shown in FIG. 1, the mobile network comprises a first clock 100, a first network 200, a first network device 300, and a second network device 400. This timing method is used to send time to a terminal device 500.

According to an embodiment of the present disclosure, the first clock 100 may be a master clock, for example, any one of an atomic clock server with precise time, a node with an accurate clock in a network timing system, or other types of clocks, and the present disclosure does not make specific limitations thereto.

According to an embodiment of the present disclosure, the first network 200 may be a core network or may be other networks, and the present disclosure does not make specific limitations thereto. The first network 200 may comprise, for example, a first network timing service slice 201. When the first network 200 is a core network, the first network timing service slice is a core network timing service slice. According to an embodiment of the present disclosure, the first network timing service slice is implemented by slices which are obtained by dividing computing, storage, and interface resources in the first network and are used in the timing service.

According to an embodiment of the present disclosure, the first network device 300 may be a mobile edge computing platform or other network devices, and the present disclosure does not make specific limitations thereto.

The second network device 400 may be a base station or a wireless access node, or may be other network devices, and the present disclosure does not make specific limitations thereto.

The terminal device 500 may be a mobile terminal or a gateway, or may be other terminal devices, and the present disclosure does not make specific limitations thereto.

A timing method according to an embodiment of the present disclosure will be described below with reference to FIGS. 2-10.

Figure 2:
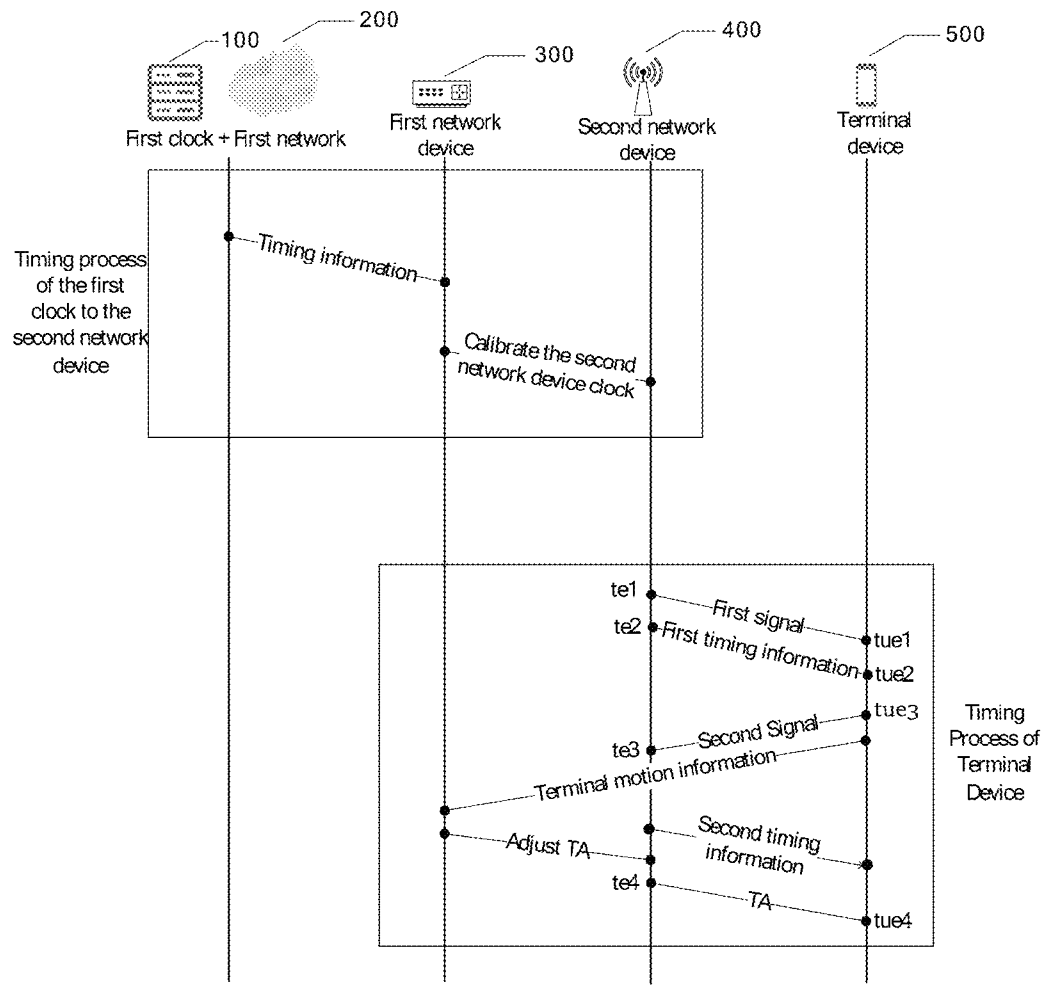
FIG. 2 shows a signal flow diagram of a timing method for a mobile network according to an embodiment of the present disclosure.

FIG. 2 shows a signal flow diagram of a timing method for a mobile network according to an embodiment of the present disclosure.

As shown in FIG. 2, the mobile network comprises a first clock 100, a first network 200, a first network device 300, and a second network device 400. The timing method is used to send time to the terminal device 500.

Figure 3:
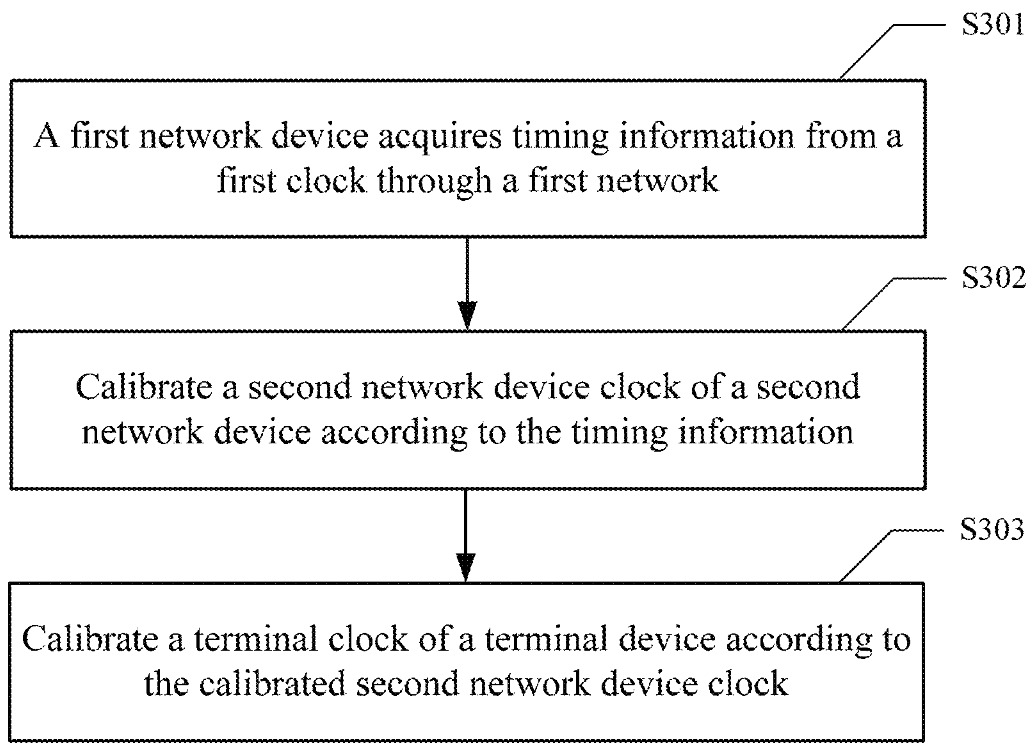
FIG. 3 shows a flowchart of a timing method for a mobile network according to an embodiment of the present disclosure.

FIG. 3 is a flowchart of a timing method for a mobile network according to an embodiment of the present disclosure.

As shown in FIG. 3, the timing method for the mobile network comprises steps S301-S303.

In step S301, the first network device 300 acquires timing information from the first clock 100 through the first network 200. In step S302, a second network device clock of the second network device 400 is calibrated according to the timing information. In step S303, a terminal clock of the terminal device 500 is calibrated according to the calibrated second network device clock.

According to an embodiment of the present disclosure, different from the relative time-synchronization between a base station and a terminal device in a traditional timing method, in the present timing method, the first clock 100 sends time to the first network device 300 through the first network 200, the first network device 300 calibrates the clock of the second network device 400, and then the second network device 400 calibrates the clock of the terminal device 500. In this way, absolute time timing is realized and timing error is reduced. Moreover, the master clock and the terminal device are sufficiently isolated, whereby improving the deployment flexibility of the master clock.

According to an embodiment of the present disclosure, the first clock may be a master clock, the first network may be a core network, the first network device may be a mobile edge computing platform, and the second network device may be a base station, and the present disclosure does not make specific limitations thereto.

Figure 4:
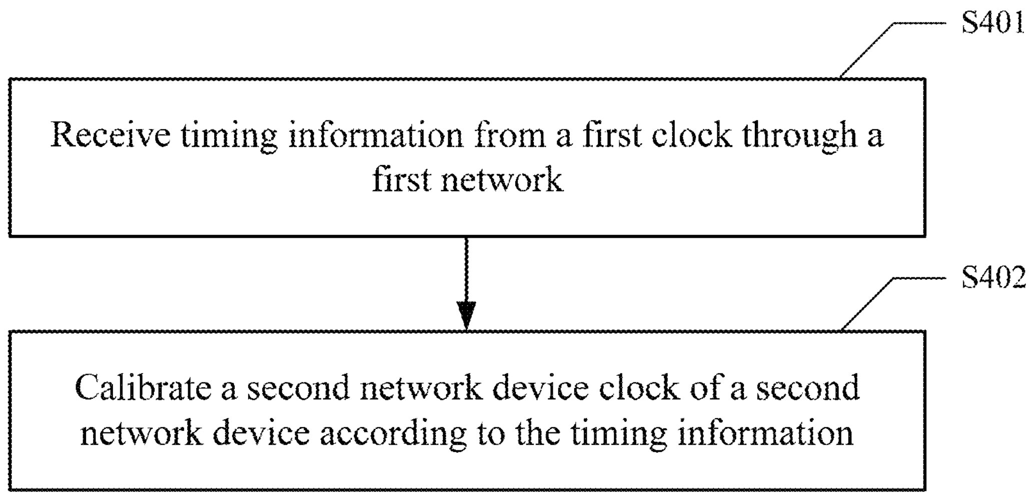
FIG. 4 shows a flowchart of a timing method for a first network device according to an embodiment of the present disclosure.

FIG. 4 shows a flowchart of a timing method for a first network device according to an embodiment of the present disclosure. As shown in FIG. 4, the timing method comprises steps S401 and S402.

In step S401, timing information is received from the first clock through a first network.

For example, in step S401, referring to FIG. 2, the first network device receives the timing information from the first clock through the first network.

According to an embodiment of the present disclosure, the first network device may receive the timing information from the first clock through a first network timing service slice. The first network timing service slice may comprise computing, storage, and interface resources in the first network. The timing service from the first clock to the first network device is implemented through the first network time service slice.

The first network device may receive the timing information from the first clock through a high precision time protocol (PTP protocol). The PTP protocol, also known as the IEEE 1588 protocol, achieves high-precision time synchronization through a delay response mechanism, which can achieve time synchronization accuracy in sub-microsecond order.

The first network device may receive the timing information through the first network at predetermined time intervals. By setting the predetermined time interval properly, it is possible to transfer the timing information with a reasonable network bandwidth, thereby improving the timing accuracy with a reasonable network load.

The first network device may also obtain timing information in other ways, and the present disclosure does not make specific limitations thereto.

In step S402, a second network device clock of a second network device is calibrated according to the timing information.

For example, in step S402, referring to FIG. 2, the first network device calibrates the second network device clock of the second network device according to the timing information.

According to an embodiment of the present disclosure, the first network device may calibrate a first network device clock of the first network device according to the timing information, and the second network device clock of the second network device may be calibrated according to the calibrated first network device clock.

The first network device may calibrate the second network device clock by using the timing information after acquiring the timing information without calibrating the first network device clock.

The first network device may calibrate the second network device clock of the second network device in response to a timing service request of the second network device.

The first network device may share a clock with the second network device. As a result, the first network device clock and the second network device clock, which are actually the same clock, can be calibrated simultaneously.

The first network device may calibrate the second network device clock actively, or the first network device may calibrate the second network device clock passively in response to the request of the second network device.

The first network device may calibrate the second network device clock in other ways, and the present disclosure does not make specific limitations thereto.

Figure 5:
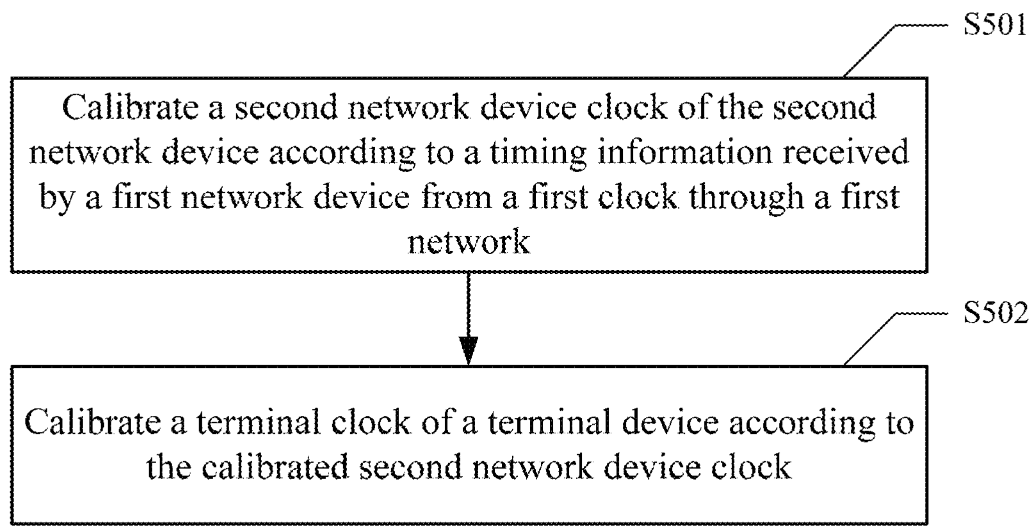
FIG. 5 shows a flowchart of a timing method for a second network device according to an embodiment of the present disclosure.

FIG. 5 shows a flowchart of a timing method for a second network device according to an embodiment of the present disclosure.

As shown in FIG. 5, the timing method comprises steps S501 and S502.

In step S501, a second network device clock of the second network device is calibrated according to a timing information received by a first network device from a first clock through a first network.

For example, in step S501, according to an embodiment of the present disclosure, referring to FIG. 2, the first network device may calibrate the second network device clock of the second network device according to the calibrated first network device clock. The first network device clock is calibrated based on the timing information received from the first clock.

The first network device may calibrate the second network device clock by using the timing information received from the first clock, without calibrating the first network device clock.

In step S502, a terminal clock of a terminal device is calibrated according to the calibrated second network device clock.

For example, in step S502, according to an embodiment of the present disclosure, the second network device may calibrate the terminal actively. Alternatively, the second network device may calibrate the terminal clock passively in response to a request of the terminal device.

Figure 6:
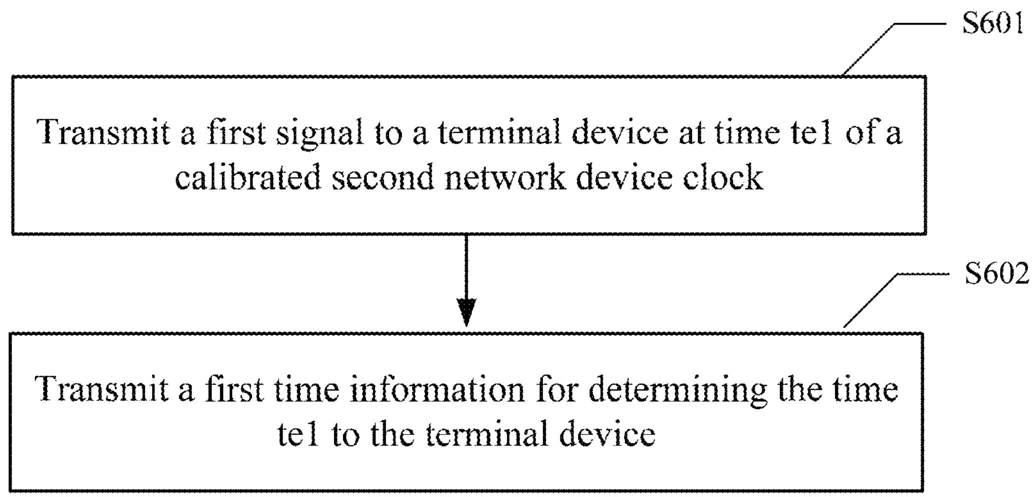
FIG. 6 shows a flowchart of calibrating a terminal clock of a terminal device according to a calibrated second network device clock, according to an embodiment of the present disclosure.

FIG. 6 shows a flowchart of calibrating a terminal clock of a terminal device according to a calibrated second network device clock, according to an embodiment of the present disclosure.

As shown in FIG. 6, the timing method comprises steps S601 and S602.

In step S601, a first signal is transmitted to the terminal device at time te1 of the calibrated second network device clock.

For example, in step S601, referring to FIG. 2, according to an embodiment of the present disclosure, the second network device may transmit the first signal to the terminal device at time te1 of the calibrated second network device clock. The first signal may be a downlink synchronization signal, and the time te1 may be an integer second.

In step S602, a first time information for determining the time te1 is transmitted to the terminal device.

For example, in step S602, referring to FIG. 2, according to an embodiment of the present disclosure, the first time information may be transmitted at time te2. The time te2 may be later than te1, or may be the same time as te1.

The terminal device adjusts the terminal clock according to an equation $t_2=t_1+\Delta t_{mod1}$ based on using an adjustment value $\Delta t_{mod1}$=tue1−te1−$t_{DL}$, wherein tDL comprises a downlink signal transmission time and a signal processing time of the terminal device, and can be set to a fixed value or ignored, t1 is the terminal clock time before adjustment, and t2 is the adjusted terminal clock time.

Figure 7:
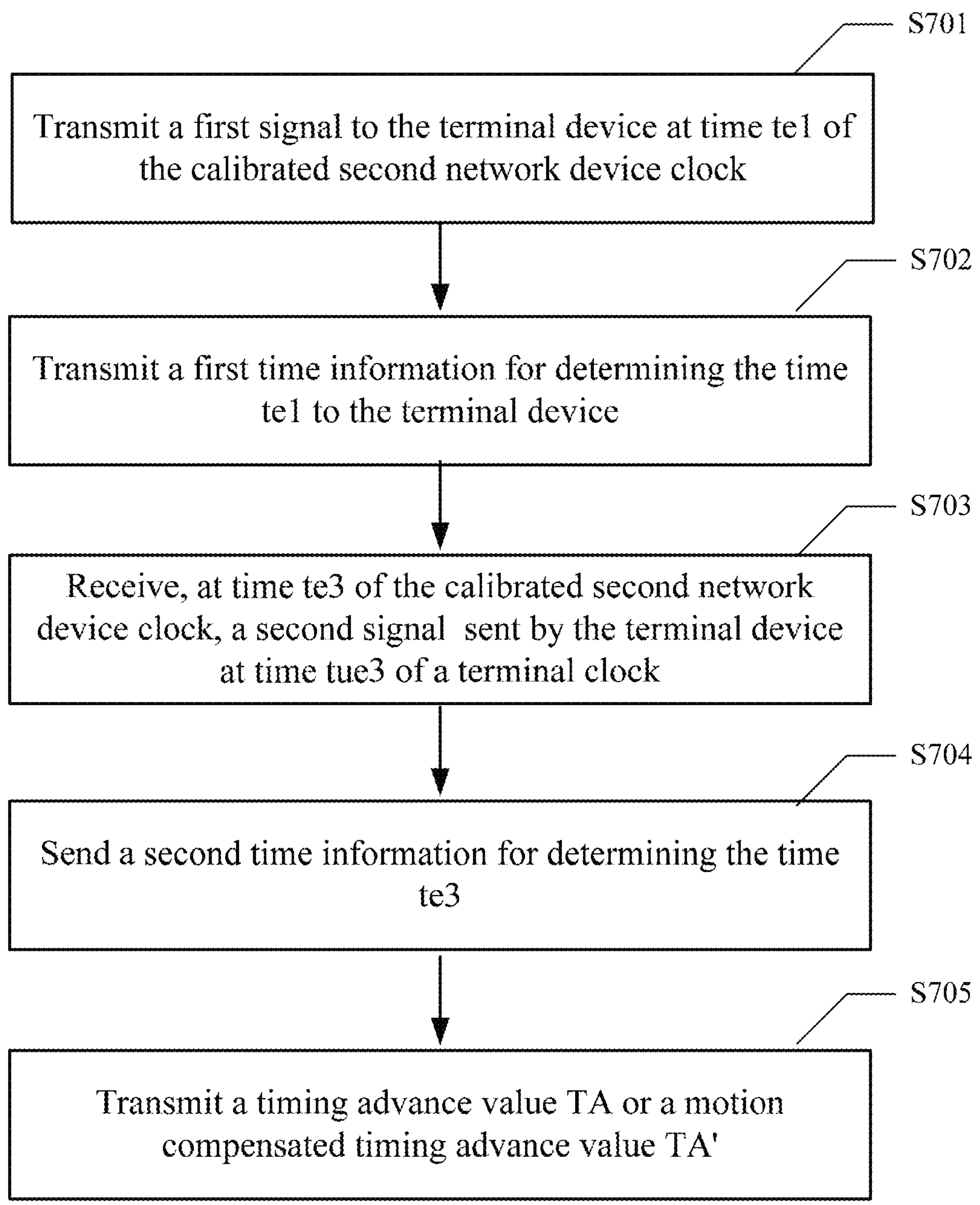
FIG. 7 shows a flowchart of calibrating a terminal clock of a terminal device according to a calibrated second network device clock, according to another an embodiment of the present disclosure.

FIG. 7 shows a flowchart of calibrating a terminal clock of a terminal device according to a calibrated second network device clock, according to another embodiment of the present disclosure.

As shown in FIG. 7, the timing method comprises steps S701-S705.

In step S701, a first signal is transmitted to the terminal device at time te1 of the calibrated second network device clock.

For example, in step S701, referring to FIG. 2, according to an embodiment of the present disclosure, the second network device may transmit the first signal to the terminal device at time te1 of the calibrated second network device clock. The first signal may be a downlink synchronization signal, and the time te1 may be an integer second.

In step S702, a first time information for determining the time te1 is transmitted to the terminal device.

For example, in step S702, referring to FIG. 2, according to an embodiment of the present disclosure, the first time information may be transmitted at time te2. The time te2 may be later than te1, or may be the same time as te1.

In step S703, a second signal sent by the terminal at time tue3 of the terminal clock is received at time te3 of the calibrated second network device clock.

For example, in step S703, referring to FIG. 2, according to an embodiment of the present disclosure, the second signal may be an uplink synchronization signal.

In step S704, a second time information for determining the time te3 is transmitted.

For example, in step S704, referring to FIG. 2, according to an embodiment of the present disclosure, the second time information may be transmitted at the time te3, or may be transmitted after the time te3.

In step S705, a timing advance value TA or a motion compensated timing advance value TA' is transmitted.

For example, in step S705, referring to FIG. 2, according to an embodiment of the present disclosure, the second network device may transmit the timing advance value TA or the motion compensated timing advance value TA' at time te4. The terminal device receives TA or TA' at time tue4.

The terminal device adjusts the terminal clock according to an equation$t_2=t_1+\Delta t_{mod2}$ based on using an adjustment value $\Delta t_{mod2}$=tue1+2tue3+TA−2te3 −te1 or $\Delta t_{mod2}$=tue1+2tue3+TA'−2te3−te1, wherein t1 is the terminal clock time before adjustment, and t2 is the adjusted terminal clock time.

Figure 8:
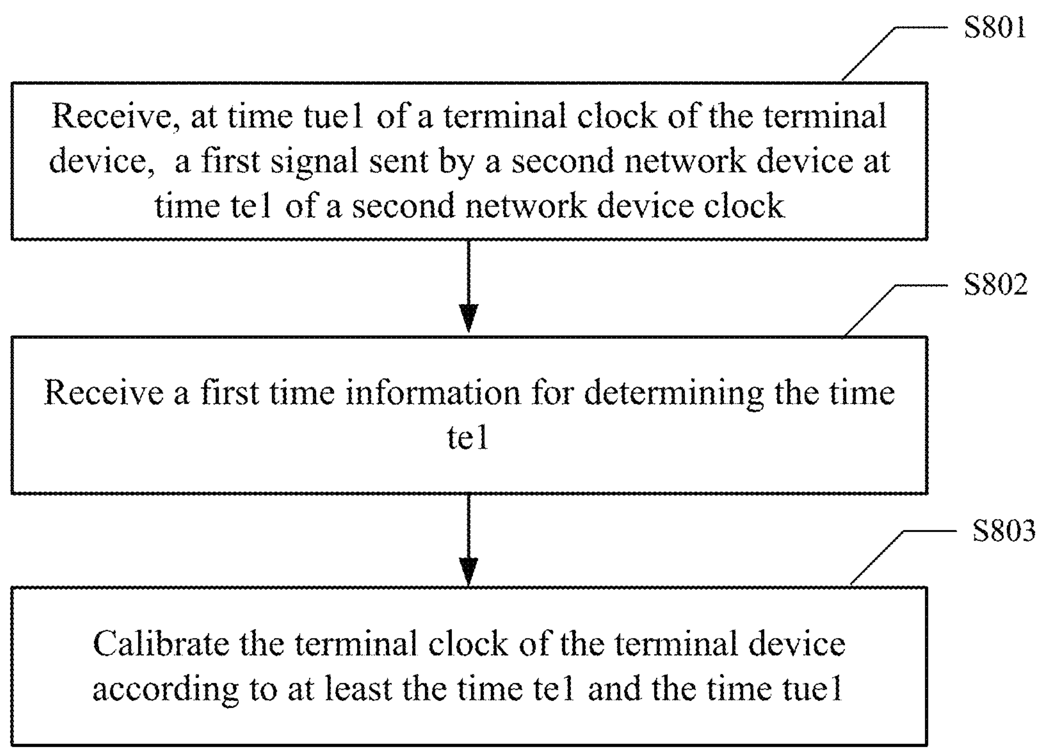
FIG. 8 shows a flowchart of a timing method for a terminal device according to an embodiment of the present disclosure.

FIG. 8 is a flowchart of a timing method for a terminal device according to an embodiment of the present disclosure.

As shown in FIG. 8, the timing method comprises steps S801-S803.

In step S801, a first signal sent by a second network device at time te1 of a second network device clock of the second network device is received at time tue1 of a terminal clock of the terminal device.

For example, in step S801, referring to FIG. 2, according to an embodiment of the present disclosure, the first signal may be a downlink synchronization signal, and the time te1 may be an integer second.

In step S802, a first time information for determining the time te1 is received.

For example, in step S802, referring to FIG. 2, according to an embodiment of the present disclosure, the first time information may be transmitted at time te2. The time te2 may be later than te1, or may be the same time as te1.

In step S803, the terminal clock of the terminal device is calibrated according to at least the time te1 and the time tue1. For example, in step S803, according to an embodiment of the present disclosure, the terminal device adjusts the terminal clock according to an equation $t_2=t_1+\Delta t_{mod1}$ using an adjustment value $\Delta t_{mod1}$=tue1−te1−$t_{DL}$, wherein tDL comprises downlink signal transmission time and signal processing time of the terminal device and can be set to a fixed value or ignored, t1 is the terminal clock time before adjustment, and t2 is the adjusted terminal clock time.

According to an embodiment of the present disclosure, the second network device clock is calibrated according to a timing information received by a first network device from a first clock through a first network.

Figure 9:
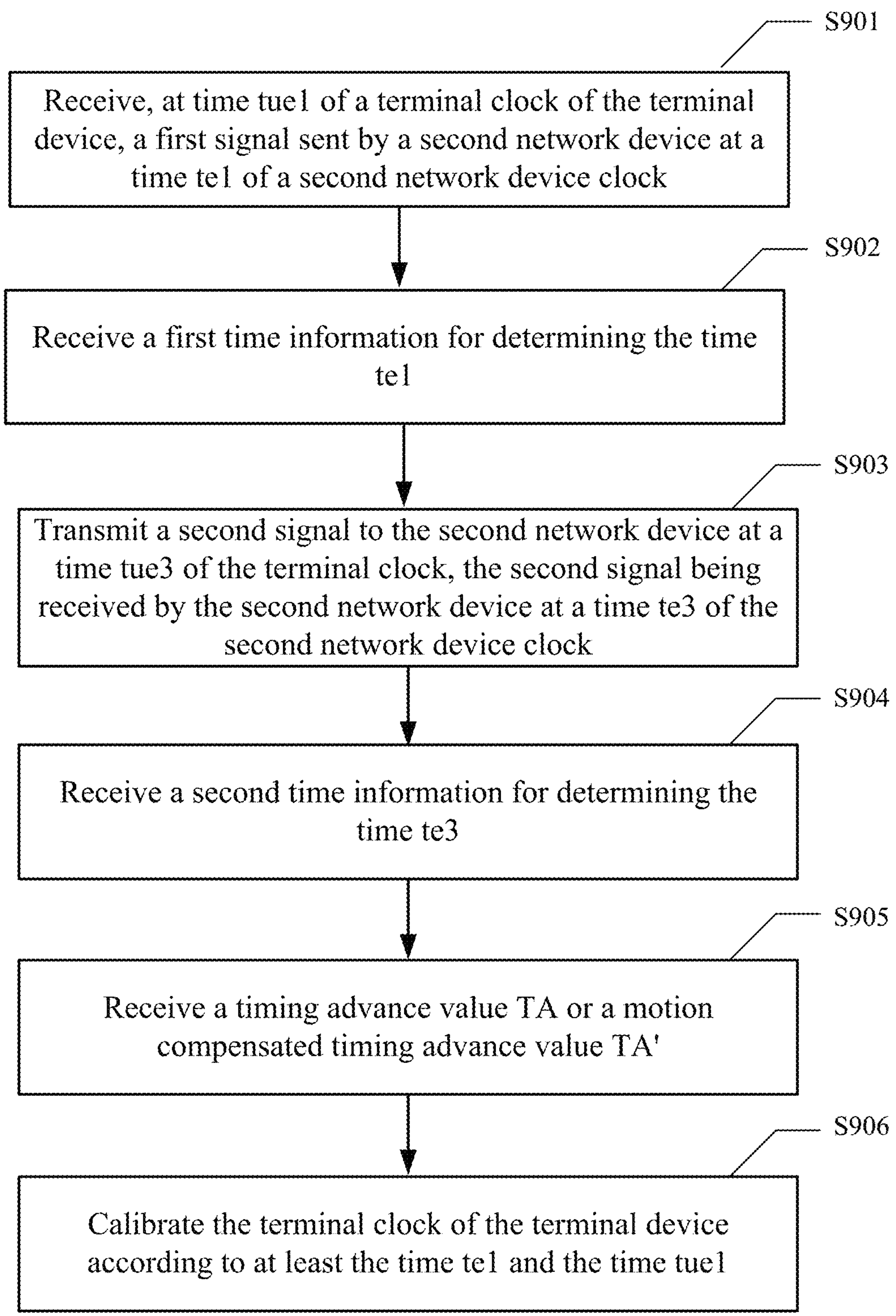
FIG. 9 shows a flowchart of a timing method for a terminal device according to another embodiment of the present disclosure.

FIG. 9 shows a flowchart of a timing method for a terminal device according to another embodiment of the present disclosure.

As shown in FIG. 9, the timing method comprises steps S901 to S906.

In step S901, a first signal sent by a second network device at time te1 of a second network device clock of the second network device is received at time tue1 of a terminal clock of the terminal device.

For example, in step S901, referring to FIG. 2, according to an embodiment of the present disclosure, the first signal may be a downlink synchronization signal, and the time te1 may be an integer second.

In step S902, a first time information for determining the time te1 is received.

For example, in step S902, referring to FIG. 2, according to an embodiment of the present disclosure, the first time information may be transmitted at time te2. The time te2 may be later than te1, or may be the same time as te1.

In step S903, a second signal is transmitted to the second network device at time tue3 of the terminal clock, the second signal being received by the second network device at time te3 of the second network device clock.

For example, in step S903, referring to FIG. 2, the second signal may be an uplink synchronization signal according to an embodiment of the present disclosure.

In step S904, a second time information for determining the time te3 is received.

For example, in step S904, referring to FIG. 2, according to an embodiment of the present disclosure, the second time information may be transmitted at the time te3 or may be transmitted after the time te3.

In step S905, a timing advance value TA or a motion compensated timing advance value TA' is received.

For example, in step S905, referring to FIG. 2, according to an embodiment of the present disclosure, the terminal device receives at time tue4 a timing advance value TA or a motion compensated timing advance value TA' transmitted by the second network device at time te4.

In step S906, the terminal clock of the terminal device is calibrated according to at least the time te1 and the time tue1.

In step S906, according to an embodiment of the present disclosure, the calibrating the terminal clock of the terminal device according to at least the time te1 and the time tue1 comprises calibrating the terminal clock according to TA or TA', te1, tue1, te3, and tue3.

For example, in step S906, referring to FIG. 2, according to an embodiment of the present disclosure, the terminal device adjusts the terminal clock according to an equation $t_2=t_1+\Delta t_{mod2}$ using an adjustment value $\Delta t_{mod2}$=tue1+2tue3+TA −2te3−te1 or $\Delta t_{mod2}$=tue1+2tue3+TA'−2te3−te1, wherein t1 is the terminal clock time before adjustment, and t2 is the adjusted terminal clock time.

Figure 10:
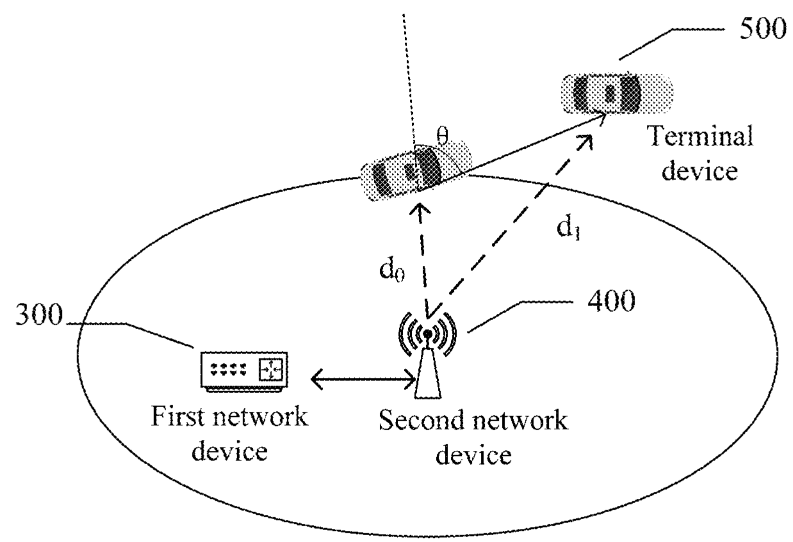
FIG. 10 shows a schematic diagram of motion compensation according to an embodiment of the present disclosure.

FIG. 10 shows a schematic diagram of motion compensation according to an embodiment of the present disclosure.

The motion compensation is to compensate an effect of movement of the terminal device on the timing advance value TA. The timing advance value after motion compensation is $$TA' = TA - \frac{1}{c}(\|\vec{d_1}\| - \|\vec{d_0}\|),$$

wherein d0 is a distance between the second network device and the terminal device at the time te1, d1 is a distance between the second network device and the terminal device when the second network device transmits TA', and c is the speed of light. According to an embodiment of the present disclosure, TA' may be calculated by the first network device, but the present disclosure is not limited thereto.

Figure 11:
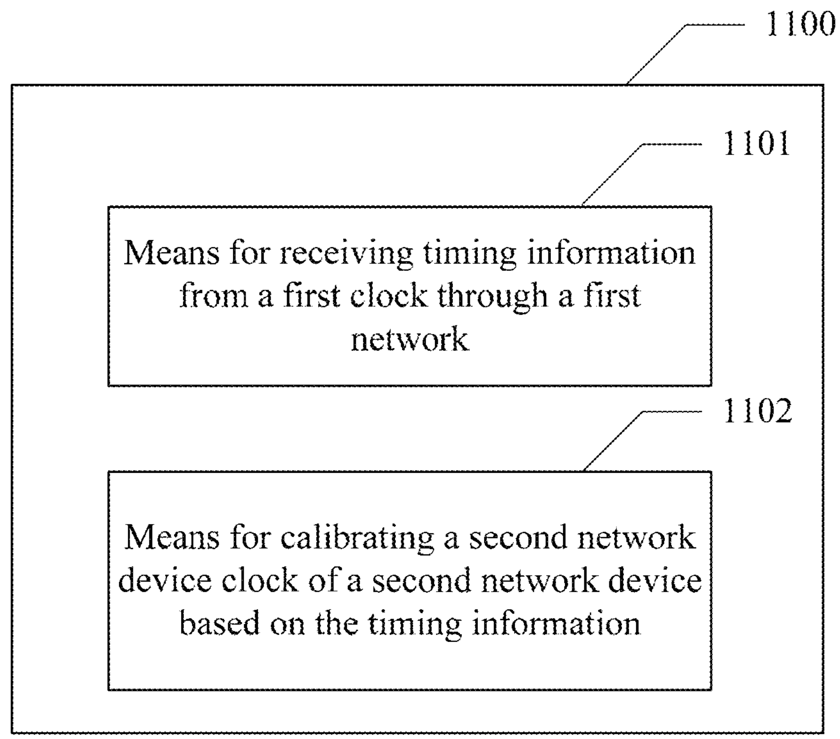
FIG. 11 shows a structural block diagram of a first network device according to an embodiment of the present disclosure.

FIG. 11 shows a structural block diagram of a first network device according to an embodiment of the present disclosure.

According to an embodiment of the present disclosure, the first network device 1100 comprises means 1101 for receiving timing information from a first clock over a first network and means 1102 for calibrating a second network device clock of a second network device based on the timing information.

According to an embodiment of the present disclosure, the receiving the timing information by the first network from the first clock comprises receiving the timing information from the first clock through the first network timing service slice. Alternatively, the receiving the timing information by the first network from the first clock comprises receiving the timing information from the first clock through the high precision timing protocol. Alternatively, the receiving the timing information by the first network from the first clock, comprises receiving the timing information from the first clock through the first network according to a predetermined time interval.

According to an embodiment of the present disclosure, the calibrating the second network device clock of the second network device according to the timing information comprises calibrating a first network device clock of the first network device according to the timing information. Alternatively, the calibrating the second network device clock of the second network device according to the timing information comprises calibrating the second network device clock of the second network device according to the calibrated first network device clock of the first network device. Alternatively, the calibrating the second network device clock of the second network device according to the timing information comprises calibrating the second network device clock of the second network device in response to a timing service request of the second network device.

According to an embodiment of the present disclosure, the first network device further comprises means for calculating a motion compensated timing advance value TA'.

According to an embodiment of the present disclosure, $$TA' = TA - \frac{1}{c}(\|\vec{d_1}\| - \|\vec{d_0}\|),$$

wherein TA is the timing advance value, d0 is a distance between the second network device and the terminal device at time te1, d1 is a distance between the second network device and the terminal device when the second network device transmits TA', and c is the speed of light.

According to an embodiment of the present disclosure, the first clock may be a master clock, or the first network may be a core network, or the first network device may be a mobile edge computing platform, or the second network device may be a base station.

Figure 12:
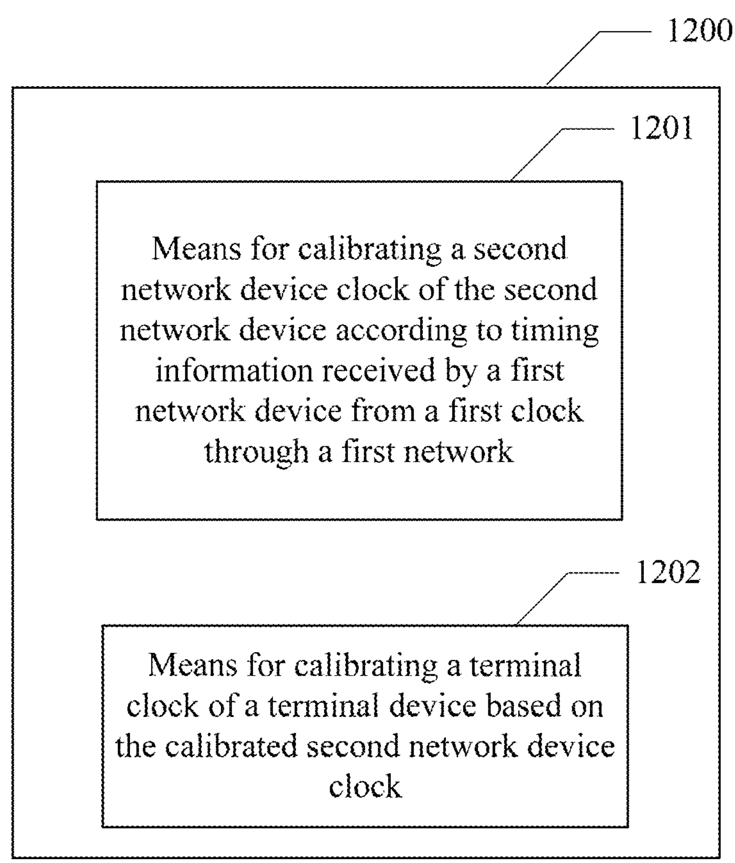
FIG. 12 shows a structural block diagram of a second network device according to an embodiment of the present disclosure.

FIG. 12 shows a structural block diagram of a second network device according to an embodiment of the present disclosure.

According to an embodiment of the present disclosure, the second network device 1200 comprises means 1201 for calibrating a second network device clock of the second network device according to a timing information received by a first network device from a first clock through a first network, and means 1202 for calibrating a terminal clock of a terminal device based on the calibrated second network device clock.

According to an embodiment of the present disclosure, the calibrating the second network device clock according to the timing information received by the first network device from the first clock through the first network comprises calibrating the second network device clock of the second network device according to the calibrated first network device clock, the first network device clock being calibrated based on the timing information received from the first clock.

According to an embodiment of the present disclosure, the calibrating the terminal clock of the terminal device according to the calibrated second network device clock comprises transmitting a first signal to the terminal device at time te1 of the calibrated second network device clock. Alternatively, the calibrating the terminal clock of the terminal device according to the calibrated second network device clock comprises transmitting a first time information for determining the time te1 to the terminal device.

According to an embodiment of the present disclosure, the calibrating the terminal clock of the terminal device according to the calibrated second network device clock, comprises receiving, at time te3 of the calibrated second network device clock, a second signal transmitted by the terminal at time tue3 of the terminal clock. Alternatively, the calibrating the terminal clock of the terminal device according to the calibrated second network device clock comprises transmitting the second time information for determining the time te3. Alternatively, calibrating the terminal clock of the terminal device according to the calibrated second network device clock, comprises transmitting a timing advance value TA or a motion compensated timing advance value TA'.

According to an embodiment of the present disclosure, $$TA' = TA - \frac{1}{c}(\|\vec{d_1}\| - \|\vec{d_0}\|),$$

wherein TA is the timing advance value, d0 is a distance between the second network device and the terminal device at the time te1, d1 is a distance between the second network device and the terminal device when the second network device transmits TA', and c is the speed of light.

According to an embodiment of the present disclosure, the first clock is a master clock, and/or the first network is a core network, and/or the first network device is a mobile edge computing platform, and/or the second network device is a base station.

Figure 13:
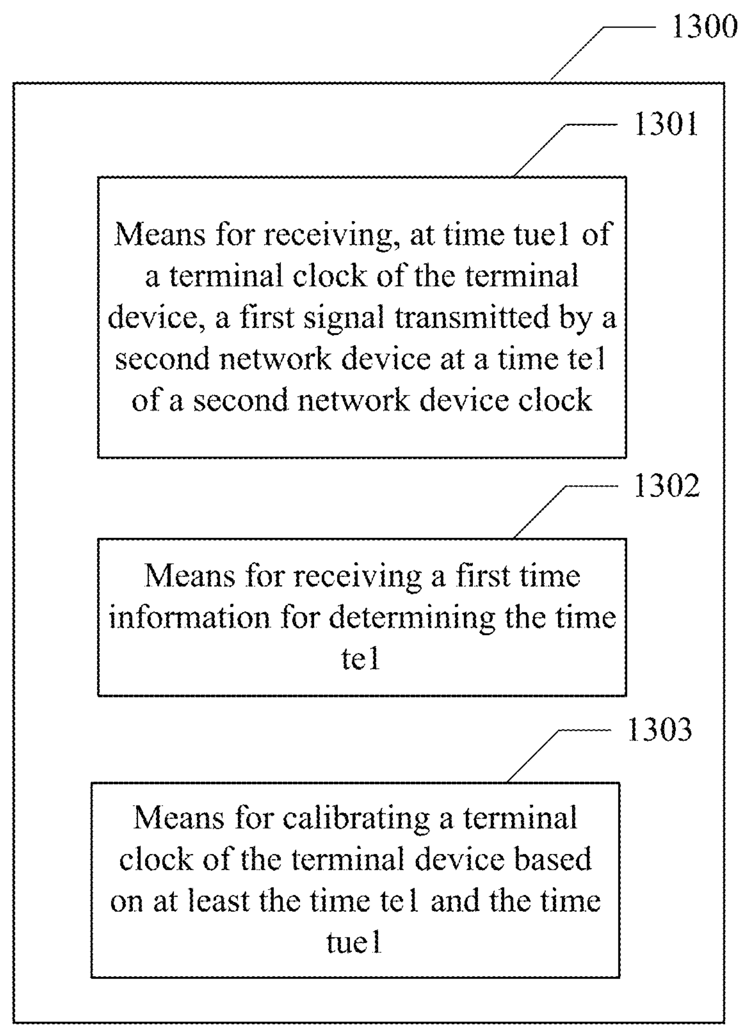
FIG. 13 shows a structural block diagram of a terminal device according to an embodiment of the present disclosure.

FIG. 13 shows a structural block diagram of a terminal device according to an embodiment of the present disclosure.

According to an embodiment of the present disclosure, the terminal device 1300 comprises means 1301 for receiving, at time tue1 of a terminal clock of the terminal device, a first signal transmitted by a second network device at time te1 of a second network device clock of a second network device, means 1302 for receiving a first time information for determining the time te1, and means 1303 for calibrating a terminal clock of the terminal device based on at least the time te1 and the time tue1.

According to an embodiment of the present disclosure, the second network device clock is calibrated according to the timing information received by the first network device from the first clock through the first network.

Figure 14:
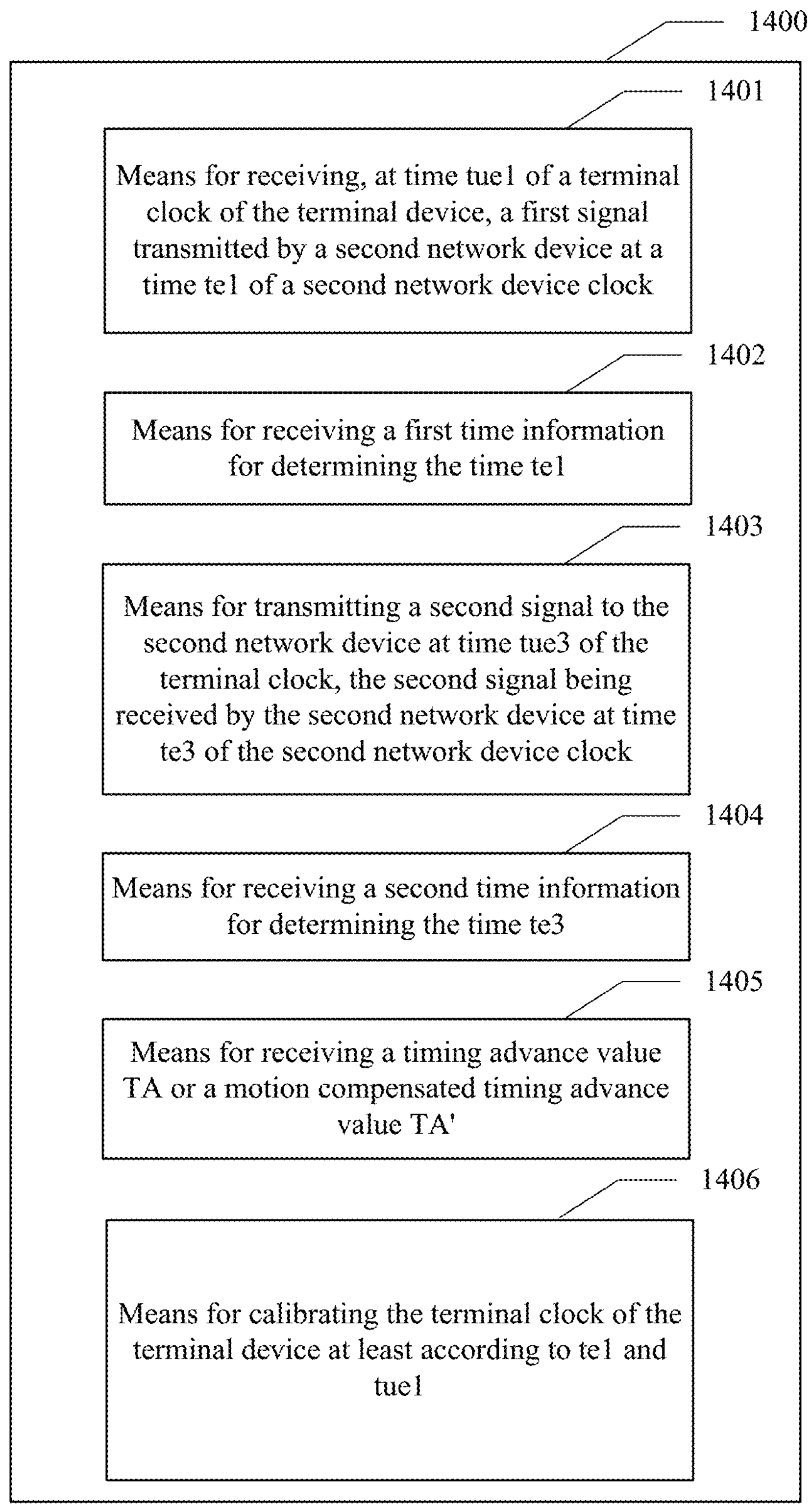
FIG. 14 shows a structural block diagram of a terminal device according to another embodiment of the present disclosure.

FIG. 14 shows a structural block diagram of a terminal device according to another embodiment of the present disclosure.

According to an embodiment of the present disclosure, the terminal device 1400 comprises means 1401 for receiving, at time tue1 of a terminal clock of the terminal device, a first signal transmitted by a second network device at time te1 of a second network device clock of the second network device, means 1402 for receiving a first time information for determining the time te1, means 1403 for transmitting a second signal to the second network device at time tue3 of the terminal clock, the second signal being received by the second network device at time te3 of the second network device clock, means 1404 for receiving a second time information for determining the time te3, means 1405 for receiving a timing advance value TA or a motion compensated timing advance value TA', and means 1406 for calibrating the terminal clock of the terminal device at least according to te1 and tue1.

According to an embodiment of the present disclosure, the calibrating the terminal clock of the terminal device according to at least te1 and tuel comprises calibrating the terminal clock according to TA or TA', te1, tue1, te3, and tue3.

According to an embodiment of the present disclosure, $$TA' = TA - \frac{1}{c}(\|\vec{d_1}\| - \|\vec{d_0}\|),$$

wherein TA is the timing advance value, d0 is a distance between the second network device and the terminal device at the time te1, d1 is a distance between the second network device and the terminal device when the second network device transmits TA', and c is the speed of light.

According to an embodiment of the present disclosure, the first clock is a master clock and/or the first network is a core network, or the first network device is a mobile edge computing platform, and/or the second network device is a base station.

Figure 15:
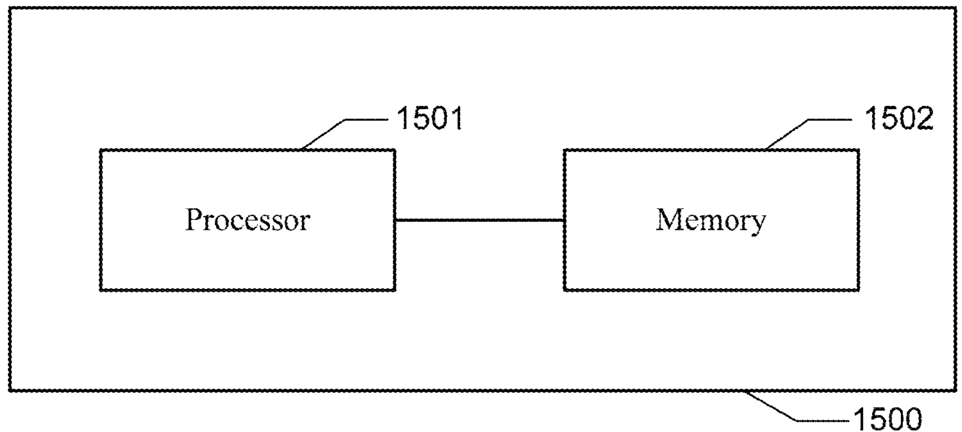
FIG. 15 shows a structural block diagram of an electronic device according to an embodiment of the present disclosure.

FIG. 15 shows a structural block diagram of an electronic device according to an embodiment of the present disclosure.

As shown in FIG. 15, the electronic device 1500 comprises a processor 1501 and a memory 1502. The memory 1502 is configured to store one or more computer instructions, and the electronic device 1500 can be used to implement a first network device or a second network device or a terminal device.

In cases where the electronic device 1500 is used to implement the first network device, the one or more computer instructions stored in the memory 1502 are executed by the processor 1501 to perform the following operations:

receiving a timing information from a first clock through a first network; and calibrating a second network device clock of a second network device according to the timing information.

According to an embodiment of the present disclosure, the timing information is received from the first clock by a first network timing service slice, or from the first clock according to the high-precision timing protocol, or from the first clock through the first network at predetermined time intervals.

According to an embodiment of the present disclosure, the one or more computer instructions stored in the memory 1502 are further executed by the processor 1501 to calibrate a first network device clock of the first network device according to the timing information, and calibrate the second network device clock of the second network device according to the calibrated first network device clock or calibrate the second network device clock of the second network device in response to a timing service request of the second network device.

According to an embodiment of the present disclosure, the one or more computer instructions stored in memory 1502 are also executed by the processor 1501 to calculate a motion compensated timing advance value TA'.

According to an embodiment of the present disclosure, $$TA' = TA - \frac{1}{c}(\|\vec{d}_1\| - \|\vec{d}_0\|),$$

wherein TA is a timing advance value, d0 is a distance between the second network device and the terminal device at time te1, d1 is a distance between the second network device and the terminal device when the second network device transmits TA', and c is the speed of light.

According to an embodiment of the present disclosure, the first clock is a master clock and/or the first network is a core network, and/or the first network device is a mobile edge computing platform, and/or the second network device is a base station.

In case where the electronic device 1500 is used to implement the second network device, the one or more computer instructions stored in the memory 1502 are executed by the processor 1501 to perform the following operations: calibrating a second network device clock of the second network device according to a timing information received by a first network device from a first clock through a first network; and calibrating a terminal clock of a terminal device according to the calibrated second network device clock.

According to an embodiment of the present disclosure, the calibrating the second network device clock of the second network device according to the timing information received by the first network device from the first clock through the first network comprises: calibrating the second network device clock of the second network device according to a calibrated first network device clock, the first network device clock being calibrated according to the timing information received from the first clock.

According to an embodiment of the present disclosure, the calibrating the terminal clock of the terminal device according to the calibrated second network device clock comprises: transmitting a first signal to the terminal device at time te1 of the calibrated second network device clock, and transmitting a first time information to the terminal device for determining the time te1.

According to an embodiment of the present disclosure, the calibrating the terminal clock of the terminal device according to the calibrated second network device clock further comprises: receiving, at time te3 of the calibrated second network device clock, a second signal sent by the terminal at time tue3 of the terminal clock; transmitting a second time information for determining the time te3; and transmitting a timing advance value TA or a motion compensated timing advance value TA'.

According to an embodiment of the present disclosure, $$TA' = TA - \frac{1}{c}(\|\vec{d}_1\| - \|\vec{d}_0\|),$$

wherein TA is the timing advance value, d0 is a distance between the second network device and the terminal device at time te1, d1 is a distance between the second network device and the terminal device when the second network device transmits TA', and c is the speed of light.

According to an embodiment of the present disclosure, the first clock is a master clock and/or the first network is a core network, and/or the first network device is a mobile edge computing platform, and/or the second network device is a base station.

In case where the electronic device 1500 is used to implement the terminal device, the one or more computer instructions stored in the memory 1502 are executed by the processor 1501 to perform the following operations: receiving, at time tue1 of the terminal clock of the terminal device, a first signal sent by a second network device at time te1 of a second network device clock of the second network device, receiving a first time information for determining the time te1, and calibrating the terminal clock of the terminal device according to at least te1 and tue1, wherein the second network device clock is calibrated according to a timing information received by the first network device from a first clock through a first network.

According to an embodiment of the present disclosure, before the terminal clock of the terminal device is calibrated according to at least te1 and tue1 the one or more computer instructions stored in the memory 1502 are further executed by the processor 1501 to perform the following operations: transmitting a second signal to the second network device at time tue3 of the terminal clock, the second signal being received by the second network device at time te3 of the second network device clock, receiving a second time information for determining the time te3, and receiving a timing advance value TA or a motion compensated timing advance value TA', wherein the calibrating the terminal clock of the terminal device according to at least the time te1 and the time tue1 comprises calibrating the terminal clock according to TA or TA', te1, tue1, te3, and tue3.

According to an embodiment of the present disclosure, $$TA' = TA - \frac{1}{c}(\|\vec{d}_1\| - \|\vec{d}_0\|),$$

wherein TA is the timing advance value, d0 is a distance between the second network device and the terminal device at time te1, d1 is a distance between the second network device and the terminal device when the second network device transmits TA', and c is the speed of light.

According to an embodiment of the present disclosure, the first clock is a master clock and/or the first network is a core network, and/or the first network device is a mobile edge computing platform, and/or the second network device is a base station.

Figure 16:
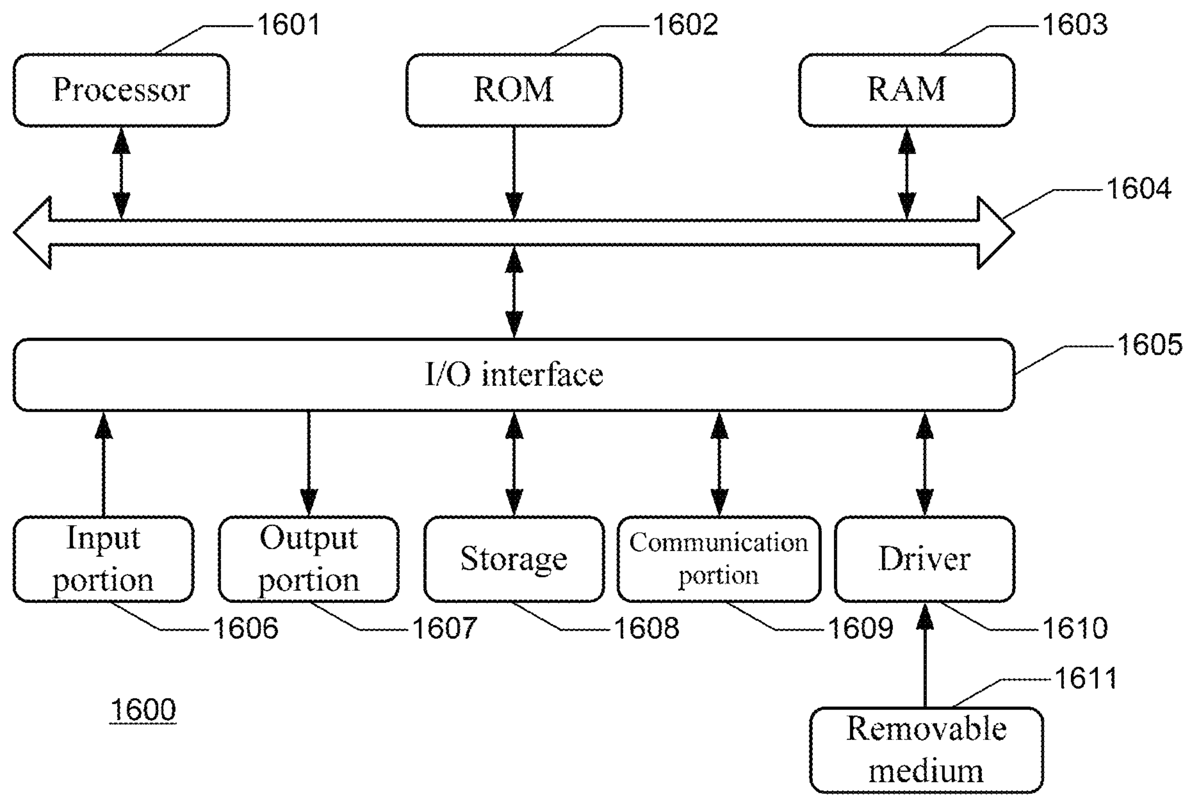
FIG. 16 shows a structural block diagram of a computer system suitable for implementing a method for any of a first network device, a second network device, and a terminal device according to an embodiment of the present disclosure.

FIG. 16 shows a structural block diagram of a computer system suitable for implementing a method for any of a first network device, a second network device, and a terminal device according to an embodiment of the present disclosure.

As shown in FIG. 16, the computer system 1600 comprises a processor (CPU) 1601 that can perform the above methods according to programs stored in a read-only memory (ROM) 1602 or programs loaded from a storage 1608 to a random storage memory (RAM) 1603. The RAM 1603 also stores various programs and data required for operation of the system 1600. The CPU 1601, the ROM 1602, and the RAM 1603 are connected to each other through a bus 1604. An input/output (I/O) interface 1605 is also coupled to the bus 1604.

The following components are connected to the I/O interface 1605: an input portion 1606 including a keyboard, a mouse, or the like; an output portion 1607 including a cathode ray tube (CRT), a liquid crystal display (LCD), a speaker, or the like; a storage 1608 including a hard disk or the like; and a communication portion 1609 including a network interface card such as a LAN card, a modem, or the like. The communication portion 1609 performs communication processing via a network such as the Internet. A driver 1610 is also coupled to an I/O interface 1605 as needed. A removable medium 1611, such as a magnetic disk, an optical disk, a magneto-optical disk, a semiconductor memory or the like, is mounted on the driver 1610 as needed so that computer programs read therefrom is installed into the storage portion 1608 as needed.

Additionally, in accordance with embodiments of the present disclosure, the methods described above may be implemented as computer software programs. For example, an embodiment of the present disclosure comprises a computer program product comprising a computer program tangibly embodied on a machine-readable medium, the computer program comprises program codes for performing the method described above. In such an embodiment, the computer program can be downloaded and installed from the network via the communication portion 1609, and/or installed from the removable medium 1611.

The flowcharts and block diagrams in the drawings illustrate the architecture, functionality, and operation of possible implementations of systems, methods and computer program products in accordance with various embodiments of the present disclosure. In this regard, each block of the flowchart or block diagram can represent a module, a program segment, or a portion of code that comprises one or more of the executable instructions to implement predetermined logical functionality. It should also be noted that in some alternative implementations, the functions noted in the blocks may also occur in a different order than that illustrated in the drawings. For example, two successively represented blocks may in fact be executed substantially in parallel, and they may sometimes be executed in the reverse order, depending upon the functionality involved. It is also noted that each block of the block diagrams and/or flowcharts, and combinations of blocks in the block diagrams and/or flowcharts, can be implemented in a dedicated hardware-based system that performs the specified function or operation, or can be implemented by a combination of dedicated hardware and computer instructions.

The units or modules described in the embodiments of the present disclosure may be implemented by software or by programmable hardware. The described units or modules may also be provided in a processor, the names of the units or modules do not in any way constitute a limitation of the unit or module itself.

In another aspect, the present disclosure further provides a computer readable storage medium, which may be a computer readable storage medium comprised in the apparatus in the above embodiment or may exist separately rather than a computer readable storage medium that is assembled into the device. The computer readable storage medium stores one or more programs that are used by one or more processors to perform the methods described in the present disclosure.

The above description is only a preferred embodiment herein and a description of the principles of the applied technology. It should be understood by those of ordinary skilled in the art that the scope of the disclosure referred to in the present disclosure is not limited to the specific combination of the above technical features, and should also be covered by the other technical solutions formed by any combination of their equivalent features with the above technical features without departing from the inventive concept. For example, the present disclosure covers technical solutions generated by replacing the above features with technical features having similar functions disclosed in but not limited to the present disclosure.

The disclosed techniques can be further appreciated through the following features that are combinable in various options:

In a first feature, a timing method for a first network device comprises receiving timing information from a first clock through the first network, and calibrating a second network device clock of a second network device according to the timing information.

In a second feature, a timing method for a second network device comprises calibrating a second network device clock of the second network device according to a timing information received by a first network device from a first clock through a first network, and calibrating a terminal clock of a terminal device according to the calibrated second network device clock.

A third feature, combinable with any proceeding features, specifies that the calibrating the second network device clock according to the timing information received by the first network device from the first clock through the first network comprises calibrating the second network device clock of the second network device based on a calibrated first network device clock of the first network device, wherein the first network device clock is calibrated based on the timing information received from the first clock.

A fourth feature, combinable with any proceeding features, specifies that the calibrating the terminal clock of the terminal device according to the calibrated second network device clock comprises transmitting a first signal to the terminal device at time tel of the calibrated second network device clock, and transmitting a first time information for determining the time te1 to the terminal device.

A fifth feature, combinable with any proceeding features, specifies that the calibrating the terminal clock of the terminal device according to the calibrated second network device clock further comprises receiving, at time te3 of the calibrated second network device clock, a second signal sent by the terminal at time tue3 of the terminal clock, transmitting a second time information for determining the time te3, and transmitting a timing advance value TA or a motion compensated timing advance value TA'.

A sixth feature, combinable with any proceeding features, specifies that $$TA' = TA - \frac{1}{c}(\|\vec{d}_1\| - \|\vec{d}_0\|),$$

wherein TA is the timing advance value, d0 is a distance between the second network device and the terminal device at the time te1, d1 is a distance between the second network device and the terminal device when the second network device transmits TA', and c is the speed of light.

A seventh feature, combinable with any proceeding features, specifies that the timing method according to claim 9, wherein the first clock is a master clock, and/or the first network is a core network, and/or the first network device is a mobile edge computing platform, and/or the second network device is a base station.

In an eighth feature, a second network device comprising means for calibrating a second network device clock of the second network device according to a timing information received by a first network device from a first clock through a first network, and means for calibrating a terminal clock of a terminal device according to the calibrated second network device clock.

A ninth feature, combinable with any proceeding features, specifies that the calibrating the second network device clock according to the timing information received by the first network device from the first clock through the first network comprises calibrating the second network device clock of the second network device based on a calibrated first network device clock of the first network device, wherein the first network device clock is calibrated based on the timing information received from the first clock.

A tenth feature, combinable with any proceeding features, specifies that the calibrating the terminal clock of the terminal device according to the calibrated second network device clock comprises transmitting a first signal to the terminal device at time te1 of the calibrated second network device clock; and transmitting a first time information for determining the time te1 to the terminal device.

An eleventh feature, combinable with any proceeding features, specifies that the calibrating the terminal clock of the terminal device according to the calibrated second network device clock further comprises receiving, at time te3 of the calibrated second network device clock, a second signal sent by the terminal at time tue3 of the terminal clock, transmitting a second time information for determining the time te3, and transmitting a timing advance value TA or a motion compensated timing advance value TA'.

A twelfth feature, combinable with any proceeding features, specifies that $$TA' = TA - \frac{1}{c}(\|\vec{d}_1\| - \|\vec{d}_0\|),$$

wherein TA is the timing advance value, d0 is a distance between the second network device and the terminal device at the time te1, d1 is a distance between the second network device and the terminal device when the second network device transmits TA', and c is the speed of light.

A thirteenth feature, combinable with any proceeding features, specifies that the first clock is a master clock, and/or the first network is a core network, and/or the first network device is a mobile edge computing platform, and/or the second network device is a base station.

In a fourteenth feature, a terminal device comprises means for receiving, at time tue1 of a terminal clock of the terminal device, a first signal sent by a second network device at time te1 of a second network device clock of the second network device, means for receiving a first time information for determining the time te1, and means for calibrating the terminal clock of the terminal device according to at least the time te1 and the time tue1. And the second network device clock is calibrated according to timing information received by a first network device from a first clock through a first network.

A fifteenth feature, combinable with any proceeding features, further comprises means for transmitting a second signal to the second network device at time tue3 of the terminal clock, the second signal being received by the second network device at time te3 of the second network device clock, means for receiving a second time information for determining the time te3, and means for receiving a timing advance value TA or a motion compensated timing advance value TA' And the calibrating the terminal clock of the terminal device according to at least the time te1 and the time tue1 comprises calibrating the terminal clock according to TA or TA', te1, tuel, te3, and tue3.

A sixteenth feature, combinable with any proceeding features, specifies that $$TA' = TA - \frac{1}{c}(\|\vec{d}_1\| - \|\vec{d}_0\|),$$

wherein TA is the timing advance value, d0 is a distance between the second network device and the terminal device at the time te1, d1 is a distance between the second network device and the terminal device when the second network device transmits TA', and c is the speed of light.

A seventeenth feature, combinable with any proceeding features, specifies that the first clock is a master clock, and/or the first network is a core network, and/or the first network device is a mobile edge computing platform, and/or the second network device is a base station.

In a eighteenth feature, a first network device comprises one or more processors, and one or more memories storing executable instructions, which, when being executed by the one or more processors, cause the one or more processors to be configured for implementing the timing method according to any of the proceeding features.

An nineteenth feature, combinable with any proceeding features, specifies that the first network device is a mobile edge computing platform.

In a twentieth feature, a second network device comprises one or more processors, and one or more memories storing executable instructions, which, when being executed by the one or more processors, cause the one or more processors to be configured for implementing the timing method according to any one proceeding features.

A twenty first feature, combinable with any proceeding features, specifies that the second network device is a base station.

In a twenty second feature, a terminal device comprises one or more processors, and one or more memories storing executable instructions, which, when being executed by the one or more processors, cause the one or more processors to be configured for implementing the timing method according to any one of proceeding features.

In a twenty third feature, a computer readable storage medium storing executable instructions, which, when being executed by a processor, cause the processor to be configured for implementing the timing method of any one of the proceeding features.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A timing method for a mobile network, the mobile network comprising: a master clock, a core network, a mobile edge computing platform, and a base station, the method comprising:

acquiring, by the mobile edge computing platform, timing information from the master clock through the core network;

calibrating a base station clock of the base station according to the timing information; and calibrating a terminal clock of a terminal device according to the calibrated base station clock, wherein the calibrating the terminal dock of the terminal device according to the calibrated base station clock comprises:

sending a first signal from the base station to the terminal device at a time te1 of the calibrated dock of the base station;

receiving, by the terminal device at a time tue1 of a terminal clock of the terminal device, the first signal;

sending from the base station, a first time information for determining the calibrated base station time te1 to the terminal device; and calibrating the terminal clock of the terminal device according to at least the time te1 and the time tue1.

2. The timing method according to claim 1, wherein the acquiring the timing information from the master clock through the core network comprises at least one of:

receiving the timing information from the master clock via a core network timing service slice;

receiving the timing information from the master clock according to a high precision timing protocol;

receiving the timing information from the master clock through the core network at predetermined time intervals.

3. The timing method according to claim 1, wherein the calibrating the base station clock of the base station according to the timing information comprises at least one of:

calibrating a mobile edge computing platform clock of the mobile edge computing platform according to the timing information, and calibrating the base station clock of the base station according to the calibrated mobile edge computing platform clock;

calibrating the base station clock of the base station in response to a timing service request of the base station.

4. The timing method according to claim 1, further comprising:

calculating a motion compensated timing advance value TA'.

5. The timing method according to claim 4, wherein $$TA' = TA - \frac{1}{c}(\|\vec{d_1}\| - \|\vec{d_0}\|),$$

wherein TA is a timing advance value, do is a distance between the base station and the terminal device at time te1, $d_1$ is a distance between the base station and the terminal device when the base station transmits the TA', and c is the speed of light.

6. A timing method for a terminal device, comprising:

acquiring, by a mobile edge computing platform, timing information from a master clock through a core network;

calibrating a base station clock of a base station according to the acquired timing information;

sending a first signal from the base station to the terminal device at a time te1 of the base clock of the base station;

receiving, by the terminal device, at a time tue1 of a terminal clock of the terminal device, the first signal;

sending, from the base station, a first time information for determining the time te1; and calibrating the terminal clock of the terminal device according to at least the time te1 and the time tue1.

7. The timing method according to claim 6, before calibrating the terminal clock of the terminal device according to at least the time te1 and the time tue1, further comprising:

transmitting a second signal to the base station at time tue3 of the terminal clock, the second signal being received by the base station at time te3 of the base station clock;

receiving a second time information for determining the time te3; and receiving a timing advance value TA or a motion compensated timing advance value TA', wherein, the calibrating the terminal clock of the terminal device according to at least the time te1 and the time tue1 comprises calibrating the terminal clock according to TA or TA', te1, tue1, te3, and tue3.

8. The timing method according to claim 7, wherein $$TA' = TA - \frac{1}{c}(\|\vec{d_1}\| - \|\vec{d_0}\|),$$

wherein TA is the timing advance value, do is a distance between the base station and the terminal device at the time te1, $d_1$ is a distance between the base station and the terminal device when the base station transmits TA', and c is the speed of light.

9. A mobile edge computing platform, comprising:

a processor; and a storage medium storing executable instructions, which when executed by the processor, configure the processor to conduct actions including:

receiving timing information from a master clock through a core network; and calibrating a base station clock of a base station according to the timing information, wherein the calibrated base station clock is used to calibrate a terminal clock of a terminal device;

the calibrating the terminal clock of the terminal device according to the calibrated base station clock comprises:

sending a first signal from the base station to the terminal device at a time te1 of the calibrated clock of the base station;

receiving, by the terminal device, at a time tue1 of a terminal clock of the terminal device, the first signal:

sending, from the base station, a first time information for determining the calibrated base station time te1 to the terminal device; and calibrating the terminal clock of the terminal device according to at least the time te1 and the time tue1.

10. The mobile edge computing platform according to claim 9, wherein the receiving the timing information from the master clock through the core network comprises at least one of:

receiving the timing information from the master clock via a core network timing service slice;

receiving the timing information from the master clock according to a high precision timing protocol;

receiving the timing information from the master clock through the core network at predetermined time intervals.

11. The mobile edge computing platform according to claim 9, wherein the calibrating the base station clock of the base station according to the timing information comprises at least one of:

calibrating a mobile edge computing platform clock of the mobile edge computing platform according to the timing information, and calibrating the base station clock of the base station according to the calibrated mobile edge computing platform clock;

calibrating the base station clock of the base station in response to a timing service request of the base station.

12. The mobile edge computing platform according to claim 9, further comprising:

means for calculating a motion compensated timing advance value TA'.

13. The mobile edge computing platform according to claim 12, wherein $$TA' = TA - \frac{1}{c}(\|\vec{d}_1\| - \|\vec{d}_0\|),$$

wherein TA is a timing advance value, $d_0$ is a distance between the base station and a terminal device at time te1, $d_1$ is a distance between the base station and a terminal device when the base station transmits the TA', and c is the speed of light.

* * * * *